United States Patent
Grazela et al.

(10) Patent No.: US 6,586,032 B2
(45) Date of Patent: Jul. 1, 2003

(54) GELATIN-FREE GUMMY CONFECTION USING GELLAN GUM AND CARRAGEENAN

(75) Inventors: Andrew J Grazela, San Diego, CA (US); Neil Argo Morrison, San Diego, CA (US)

(73) Assignee: CP Kelco U.S. Inc., Wilmington, DE (US)

( * ) Notice: Subject to any disclaimer, the term of this patent is extended or adjusted under 35 U.S.C. 154(b) by 105 days.

(21) Appl. No.: 09/972,189

(22) Filed: Oct. 9, 2001

(65) Prior Publication Data

US 2002/0076478 A1 Jun. 20, 2002

Related U.S. Application Data

(60) Provisional application No. 60/239,258, filed on Oct. 12, 2000.

(51) Int. Cl.[7] .......................... A23G 3/00; A23L 1/0532
(52) U.S. Cl. .................. 426/575; 426/658; 426/660; 426/512; 426/516; 426/519
(58) Field of Search ................. 426/575, 658, 426/660, 512, 516, 519, 573

(56) References Cited

U.S. PATENT DOCUMENTS

| | | | |
|---|---|---|---|
| 2,864,706 A | 12/1958 | Stoloff | |
| 5,192,577 A | 3/1993 | Masson | |
| 5,244,686 A * | 9/1993 | Fukuyama et al. | 426/575 |
| 5,342,626 A | 8/1994 | Winston, Jr. et al. | |
| 5,429,830 A * | 7/1995 | Janovsky et al. | 426/94 |
| 5,607,716 A * | 3/1997 | Doherty et al. | 426/660 |
| 6,063,915 A * | 5/2000 | Hansen et al. | 536/114 |
| 6,214,376 B1 | 4/2001 | Gennadios | |
| 6,331,205 B1 | 12/2001 | Paris et al. | |
| 6,340,473 B1 * | 1/2002 | Tanner et al. | 424/451 |
| 6,531,174 * | 3/2003 | Barrett et al. | 426/573 |
| 2001/0036499 A1 * | 11/2001 | Ong et al. | 426/573 |

FOREIGN PATENT DOCUMENTS

| | | |
|---|---|---|
| EP | 0 567 088 A2 | 10/1993 |
| FR | 2 796 248 | 12/1999 |
| GB | 2 219 803 A | 12/1989 |
| WO | WO 00/19836 | 4/2000 |

OTHER PUBLICATIONS

Kirshnamurthy Institute of Algology, Mahalingapuram, Chennai– 600 034, National Workshop on "Carrageenan and Carrageenophytes", Nov. 23–25, 2002, Department of Ocean Development, Government of India, New Delhi.*

* cited by examiner

*Primary Examiner*—Nina Bhat
(74) *Attorney, Agent, or Firm*—Banner & Witcoff, Ltd.

(57) ABSTRACT

A gelatin-free gummy confection comprising the combination of gellan gum and nu-carrageenan, nu-/iota-carrageenan or both. The gellan gum and nu-carrageenan, nu-/iota-carrageenan or both, provides a firm, resilient, gelatin-like texture in a gelatin-free gummy confection.

16 Claims, No Drawings

GELATIN-FREE GUMMY CONFECTION USING GELLAN GUM AND CARRAGEENAN

This application claims priority to provisional application Ser. No. 60/239,258, filed Oct. 12, 2000, which is hereby incorporated by reference in it's entirety.

FIELD OF THE INVENTION

The present invention is directed to the combination of gellan gum and nu- and/or nu-/iota-carrageenan to provide a firm, resilient, gelatin-like texture in a gelatin-free gummy confection.

BACKGROUND OF THE INVENTION

Gelatin, because of its firm, springy, resilient character, is used to make "gummy" gelled confectionery products. Gelatin is derived from animal sources; usually pork or bovine. Many people, because of religious dietary restrictions (Kosher, Halal, etc.) or a vegetarian diet, are unable to consume gelatin-containing confections. In addition, gelatin-based confections tend to soften or melt under hot ambient conditions, i.e. temperatures above about 40° C.

Gelatin alternatives have been used and are available such as gellan gum. However, although gellan gum products do provide the desired firmness and heat stability, the products lack the gelatin-like texture due to their relatively low springiness and resiliency.

Texture Profile Analysis (TPA) is used to characterize the many aspects of the texture of a gelled product. Specifically, TPA cohesiveness is a measure of the resiliency of a product, TPA elasticity is a measure of the springiness, and TPA hardness is a measure of firmness. The signature of a gelatin gel is high resiliency and high springiness, along with relatively high firmness.

Gelatin-based gummy confections typically have both TPA cohesiveness and TPA elasticity values in the range of 80% to 90%, and TPA hardness values in the range of 25 to 30 lbs(f). Gelatin alternatives commonly found in the marketplace, such as starch and pectin, typically attain the proper TPA hardness, but have lower TPA elasticity values ranging from 30% to 50% and much lower TPA cohesiveness values ranging from 15% to 30%. More recent developments, using gellan gum alone, have produced products with acceptable TPA hardness and improved, though still low, TPA elasticity in the 50% to 70% range and TPA cohesiveness in the range of 30% to 50%. Even more recent developments have taken place with newly available types of carrageenan; specifically, incompletely modified iota-copolymers of nu- and iota-carrageenans, hereinafter referred to as "nu- and/or nu-/iota-carrageenan." Studies of nu- and nu-/iota-carrageenan as a gelatin alternative have produced products with TPA cohesiveness and elasticity values of 75% and higher, but with unacceptably low TPA hardness values in the 10 to 15 lbs(f) range.

The following are typical TPA analysis of a variety of gelatin-based gummy confectionery products:

| Product | TPA Hardness lbs(f) | TPA elasticity % | TPA cohesiveness % |
|---|---|---|---|
| Goldbaren (Haribo) | 30 ± 3 | 86 ± 1 | 82 ± 3 |
| "Wild 'n' Fruity" (Brach's) | 25 ± 2 | 91 ± 1 | 86 + 3 |
| "Amazin' Fruit" (Hershey's) | 28 ± 2 | 90 ± 2 | 81 ± 1 |
| Composite | 28 ± 3 | 89 ± 3 | 83 ± 3 |

WO 00/19836 describes a hydrocolloid confectionery product comprising iota-carrageenan or a mixture of carageenans having at least 50% iota-carageenan. This publication suggests using iota-carageenan with other hydrocolloids such as agar agar, xanthan gum, locust bean gum, gellan gum, gum arabic, pectin, gelatin, kappa-carrageenan, guar gum, or modified or unmodified starches. WO 00/19836 does not provide textural data, nor does it make reference in any way to nu-carrageenan.

It is desirable to have a gelled gelatin-free product which is gelatin-like in its properties. It is also desirable to have a gelled product with better heat stability than gelatin products and in particular can be shipped and stored at temperatures of greater than 40° C. to enable distribution in hot climate markets.

SUMMARY OF THE INVENTION

The invention is directed to a gelatin-free gummy confection comprising gellan gum and nu-carrageenan, nu-/iota-carrageenan, or both, in amounts sufficient to provide a cohesive gelled product, preferably about 0.25% to about 0.75% by weight gellan gum and about 2% to about 3% by weight carrageenan based on the total weight of the composition. The pH of the composition is preferably about 3 to about 4.5, more preferably about 3.7 to about 4.

In a preferred embodiment, the confection further comprises sugar, glucose syrup, corn syrup, high fructose corn syrup, juice concentrate, or mixtures thereof. The pH may be adjusted by the addition of suitable acid, buffer, or both.

The invention is further directed to a method of preparing a gelatin-free gummy confection comprising heating a solution of a first sweetener and water, preferably to about 30° C. to about 50° C.; mixing a second sweetener, nu-carrageenan, nu-/iota-carrageenan or both, and gellan gum and adding to the solution; and boiling the solution, preferably until about 70% to about 76% solids are obtained.

DETAILED DESCRIPTION OF THE INVENTION

The invention is directed to a "gelatin-like" confectionery products which, because they are gelatin-free, can be consumed by individuals having dietary constraints which do not allow them to eat certain animal-derived products. Because the products of the invention produce heat-stable products, these gelatin-like confections can be distributed in hot-climate countries where gelatin-based confectionery distribution is limited or prohibited.

The invention is directed to a gummy confection composition prepared with gellan gum and carrageenan. Generally, carrageenan is used as a gelatin replacement for dessert gels. However, it was discovered that particular types of carrageenan combined with gellan gum provide gummy products having acceptable firmness, springiness, and resiliency. For instance, a combination of gellan gum at about 0.25% to about 0.75% by weight and nu-carrageenan, nu-/iota-carrageenan or both, at about 2.5% to about 3% by weight based on total weight of the product produces a gummy confection with TPA hardness values in excess of 20 lbs(f), and TPA cohesiveness and elasticity values of 75% to 80%.

Gellan gum useful herein is that produced by inoculating a carefully formulated fermentation medium with the microorganism Sphingamonas elodea (ATTC 31461). Gellan gum is available from CP Kelco Company, 1313 North Market Street, Wilmington, Del. 19894, USA. Typical brand names include KELCOGEL and GELRITE. KELCOGEL and GELRITE are trademarks of CP Kelco Company. Particularly preferred is KELCOGEL F. Gellan gum useful herein includes any form available such as but not limited to non-clarified, clarified, and partially clarified native, deacetylated and partially deacetylated forms as well as mixtures thereof and the like. Gellan gum may be prepared according to the methods disclosed in U.S. Pat. Nos. 4,326,052 and 4,385,123 both of which are incorporated by reference in their entirety.

The type of carrageenan is important to the invention. The carrageenan is a nu-carrageenan, nu-/iota-carrageenan, or both or a mixture of carrageenans having at least 50% of a nu-carrageenan, nu-/iota-carrageenan or both, preferably at least 75% more preferably at least 90%. Among gelling carrageenans, iota- produces more elastic gels than does kappa-carrageenan; however, nu- and/or nu-/iota-carragenans form the most elastic gels of all. The carrageenan is preferably from the line of GENUTINE nu- and/or nu-/iota-carrageenan and carrageenan blends available from CP Kelco Company. The addition of GENUTINE increases cohesiveness values in gellan gum products, typically to above 50%.

The composition contains sufficient amounts of gellan gum to provide a gelled product with cohesiveness and elasticity but without processing difficulties. Preferably, the amount of gellan gum is about 0.25 wt % to about 0.75 wt %, more preferably about 0.25 wt % to about 0.5 wt %. The composition contains sufficient carrageenan to provide cohesiveness without processing difficulties. Preferably, the amount of carrageenan is about 1.5 wt % to about 3 wt %, preferably about 2.5 wt % to about 3 wt %.

The pH of the composition is about 3 to about 5, preferably about 3.7 to about 4. The pH may be adjusted by any suitable acid, buffer, or both. Suitable acids include but are not limited to citric, adipic, malic, and lactic. Suitable buffers include but are not limited to sodium citrate and potassium citrate. For example, a preferred acid/buffer system is 1.33% of a 54% citric acid solution, buffered with sodium citrate. Higher acid (lower pH) results in a lack of structure while lower acid levels do not provide enough "acid bite" in the flavor profile.

The composition may contain a sweetener such as glucose syrup, corn syrup, high fructose corn syrup, and juice concentrates. Typically, the composition contains about 30 to about 80 wt %, preferably about 45 wt %, glucose syrup. The glucose syrup is combined with about 0 to about 25 wt %, preferably about 19 wt %, water.

The composition may also contain a about 0 to about 50 wt %, preferably about 30 wt % sugar. If a sugar-free confection is desired, then sugar alternatives may be added such as maltodextrin, sugar alcohol(s) and artificial sweetener(s) such as aspartame, acesulfame-K, and the like.

Other ingredients used to prepare the gummy composition include, but are not limited to, colorant(s), flavorant(s)s, sweetener(s), mint(s), fragrance(s), active ingredient(s), plasticizer, bulking agents, whipping aids, and mixtures thereof.

The composition has very good heat stability and can withstand extended storage at above 40° C., typically at least up to 50° C.

The gummy confection may be prepared by any suitable procedure. Typically a solution of a first sweetener and water is heated, preferably to about 30° C. to about 50° C., preferably to about 40° C. Then a mixture of a second sweetener, carrageenan, and gellan gum is added to the solution and the solution is boiled. The first sweetener is preferably glucose syrup, corn syrup, high fructose corn syrup, juice concentrate, or mixtures thereof. The second sweetener is preferably sugar. The solution is preferably boiled until about 70 wt % to about 76 wt % solids are obtained, preferably about 72 wt % solids.

For example, a first composition is prepared with about 45% glucose syrup and about 19 wt % water each based on total weight of the gummy composition. Additional water may be added to aid hydration. The composition is heated to about 30° C. to about 50° C. A second composition is prepared with about 30 wt % sugar. Then about 1.5 wt % to about 3 wt % carrageenan and about 0.25 wt % to about 1 wt % gellan gum are then added. This is a dry composition which is then dispersed in the first composition with fast mixing (typically, but not limited to 1200 rpm.) The mixture is heated to boiling and boiled until about 70% to about 76% solids. A third composition is prepared with about 1.3 wt %, citric acid (typically 54% solution) and about 1.3 wt %, sodium citrate (typically 33% solution). This composition is added to the mixture and mixed until homogenous.

EXAMPLES

The following examples are provided to illustrate the preparation of gummy confections in accordance with this invention and are provided by way of illustration and are not intended to limit the invention in any way.

Example 1

Gellan gum and carrageenan formulation and process of making a gelled product.

|  | Percent |
|---|---|
| Part A | |
| Glucose Syrup | 45 |
| Water | 19.3 |
| Part B | |
| Sucrose | 30 |
| GENUTINE type X-8302 carrageenan | 2.5 |
| KELCOGEL F gellan gum | 0.5 |
| Part C | |
| Citric acid solution | 1.3 |
| Sodium citrate solution | 1.3 |
| Total | 100 |

The part A ingredients are combined in a heating vessel and warmed to 40° C. (Additional water may be added to aid in the complete hydration of the hydrocolloids if necessary.) The part B ingredients are dry blended and added to the heating vessel with fast mixing. The material is brought to a boil and then boiled to 72% solids. The part C ingredients are combined (including color and flavor if desired), added to the heating vessel, and then mixed until homogenous. The material is placed into a depositing device and cast into prepared starch molds. The molds are stored at approximately 30° C. and 35% r.h. for 3 to 4 days, until solids reach 82 to 85%. The samples are demolded and waxed, then stored at room temperature in sealed bags.

Example 2

The following compositions were prepared using the same method as Example 1.

|  | Trial 1 % | Trial 2 % | Trial 3 % | Trial 4 % | Trial 5 % |
|---|---|---|---|---|---|
| Part A |  |  |  |  |  |
| Glucose Syrup | 45 | 45 | 45 | 45 | 45 |
| Water | 19.3 | 19.3 | 19.3 | 19.3 | 19.3 |
| Part B |  |  |  |  |  |
| Sucrose | 30 | 29 | 30.25 | 30.5 | 30.75 |
| GENUTINE type X-8302 carrageenan | 3 | 3 | 2.5 | 2 | 1.5 |
| KELCOGEL F gellan gum | — | 1 | .25 | .5 | .75 |
| Part C |  |  |  |  |  |
| Citric acid solution | 1.3 | 1.3 | 1.3 | 1.3 | 1.3 |
| Sodium citrate sol'n | 1.3 | 1.3 | 1.3 | 1.3 | 1.3 |
| Total | 100 | 100 | 100 | 100 | 100 |

The results of the trials are tabulated below:

| Trial # | Open time min | Degree of Tailing | TPA Hardness lbs (f) | TPA elasticity % | TPA cohesiveness % |
|---|---|---|---|---|---|
| 1 | 3.5 | 1.5/5 | 15 ± 1 | 81 ± 3 | 84 ± 4 |
| 2 | 2.5 | 2/5 | 56 ± 8 | 63 ± 2 | 60 ± 1 |
| 3 | >5 | 1.5/5 | 21 ± 1 | 77.3 ± 0.8 | 76 ± 4 |
| 4 | >5 | 1/5 | 20 ± 3 | 78 ± 2 | 68 ± 5 |
| 5 | >5 | 1/5 | 30 ± 3 | 74 ± 2 | 54 ± 2 |

"Open time" is measured from the moment the material is placed in a depositing device until the product has viscosified and/or set so that it can no longer be deposited. Open time of three minutes was the minimum for reasonable processing of the material.

"Degree of tailing" is a subjective rating of 0–5, with higher values denoting heavier tailing. A value of "2" was the maximum for reasonable processing of the material.

Trial 1, containing no gellan gum, had excellent elasticity and cohesiveness but low hardness. The finished products were soft and malleable. Trial 2 showed a dramatic increase in hardness, but reduced elasticity and cohesiveness. The degree of tailing was increased to a marginal level and open time was reduced to an unacceptably low level. The gellan gum improved the firmness of the confection. However, 1% is too high a level of the gellan gum, as the hardness was increased to well above the control level of 28 lbs(f) (q.v.) while the elasticity and cohesiveness were reduced to far below the control levels of 89% and 83% respectively (q.v.).

The final three trials, in combination with Trial 1, formed a series in which the carrageenan level was reduced stepwise from 3% to 1.5%, while the gellan gum level was increased stepwise from 0% to 0.75%. TPA hardness increased fairly steadily from 15 lbs(f) to 30 lbs(f) through the series, most likely due to increasing levels of gellan gum. On the other hand, TPA cohesiveness decreased steadily from 84% to 54%, probably mostly due to decreasing levels of carrageenan. TPA elasticity remained at a fairly high level throughout the series.

Overall, Trial 3, with 2.5% carrageenan and 0.25% gellan gum, produced the best results. The samples had only 25% lower hardness than the composite control—rather than the 50% lower hardness of the Trial 1 product. In addition, the Trial 3 product was only 8% lower than the composite control in cohesiveness.

Samples from all of the trials in this study were placed in sealed bags and then in a laboratory oven at 50° C. for three days. At the end of the time, none of the samples had become sticky, lost definition, spread, or melted to any measurable degree. Thus, the samples had good heat stability.

What is claimed is:

1. A gelatin-free gummy confection comprising gellan gum and nu-carrageenan, nu-/iota-carrageenan or both, or a mixture of carrageenans having at least 50% nu-carrageenan, nu-/iota-carrageenan or both, in amounts sufficient to provide a cohesive gelled product.

2. The confection according to claim 1 comprising about 0.25% to about 0.75% by weight gellan gum and about 2% to about 3% by weight carrageenan based on the total weight of the composition.

3. The confection according to claim 2 comprising about 0.25% to about 0.5% by weight gellan gum and about 2.5% to about 3% by weight carrageenan based on the total weight of the composition.

4. The confection according to claim 1 further comprising sugar, glucose syrup, corn syrup, high fructose corn syrup, juice concentrate, or mixtures thereof.

5. The confection according to claim 1 wherein the pH of the composition is about 3 to about 5.

6. The confection according to claim 5 wherein the pH of the composition is about 3.7 to about 4.

7. The confection according to claim 5 wherein the pH is adjusted by the addition of suitable acid, buffer, or both.

8. The confection according to claim 1 comprising a mixture of carrageenans wherein the mixture comprises at least 75% nu-carrageenan, nu-/iota-carrageenan or both.

9. The confection according to claim 1 comprising a mixture of carrageenans wherein the mixture comprises at least 90% nu-carrageenan, nu-/iota-carrageenan or both.

10. A method of preparing a gelatin-free gummy confection comprising heating a solution of a first sweetener and water; mixing a second sweetener, carrageenan or a mixture of carrageenans having at least 50% nu-carrageenan, nu-/iota-carrageenan or both, and gellan gum and adding to the solution; and boiling the solution.

11. The method according to claim 10 wherein the first sweetener is glucose syrup, corn syrup, high fructose corn syrup, juice concentrate, or mixtures thereof.

12. The method according to claim 10 wherein the second sweetener is sugar.

13. The method according to claim 10 wherein the solution of first sweetener and water is heated to about 30° C. to about 50° C.

14. The method according to claim 10 wherein the solution is boiled until about 70% to about 76% solids are obtained.

15. The method according to claim 10 wherein the confection comprises about 0.25% to about 0.75% by weight gellan gum and about 2% to about 3% by weight carrageenan based on the total weight of the composition.

16. The method according to claim 10 further comprising adding a suitable acid, buffer, or both to the solution after boiling.

* * * * *